D. S. McCANN.
SUBSOIL DISK.
APPLICATION FILED AUG. 30, 1912.
1,062,246.
Patented May 20, 1913.
2 SHEETS—SHEET 1.
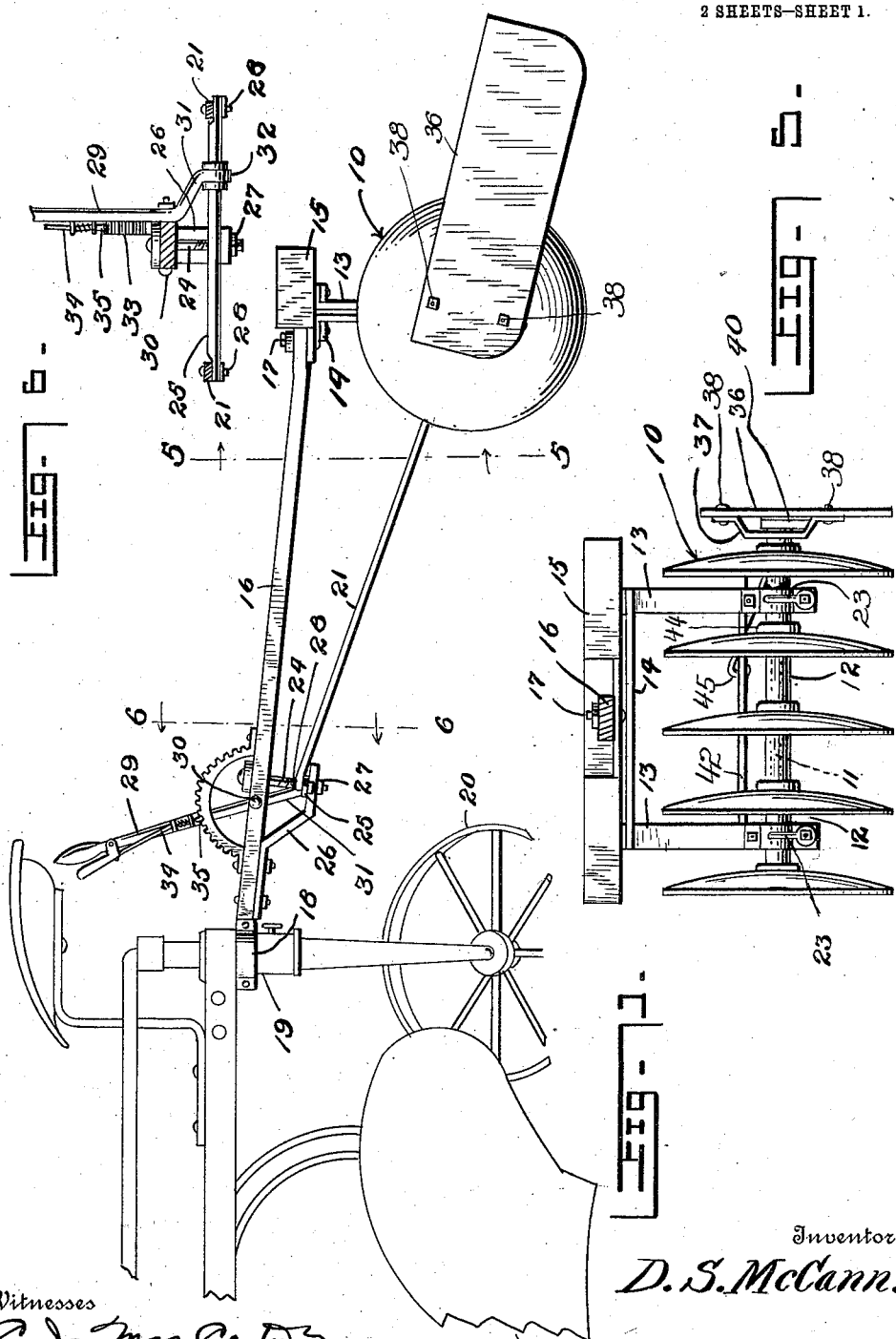
Witnesses
R. J. Mac Carter
Francis Boyle
Inventor
D. S. McCann.
By
Attorney

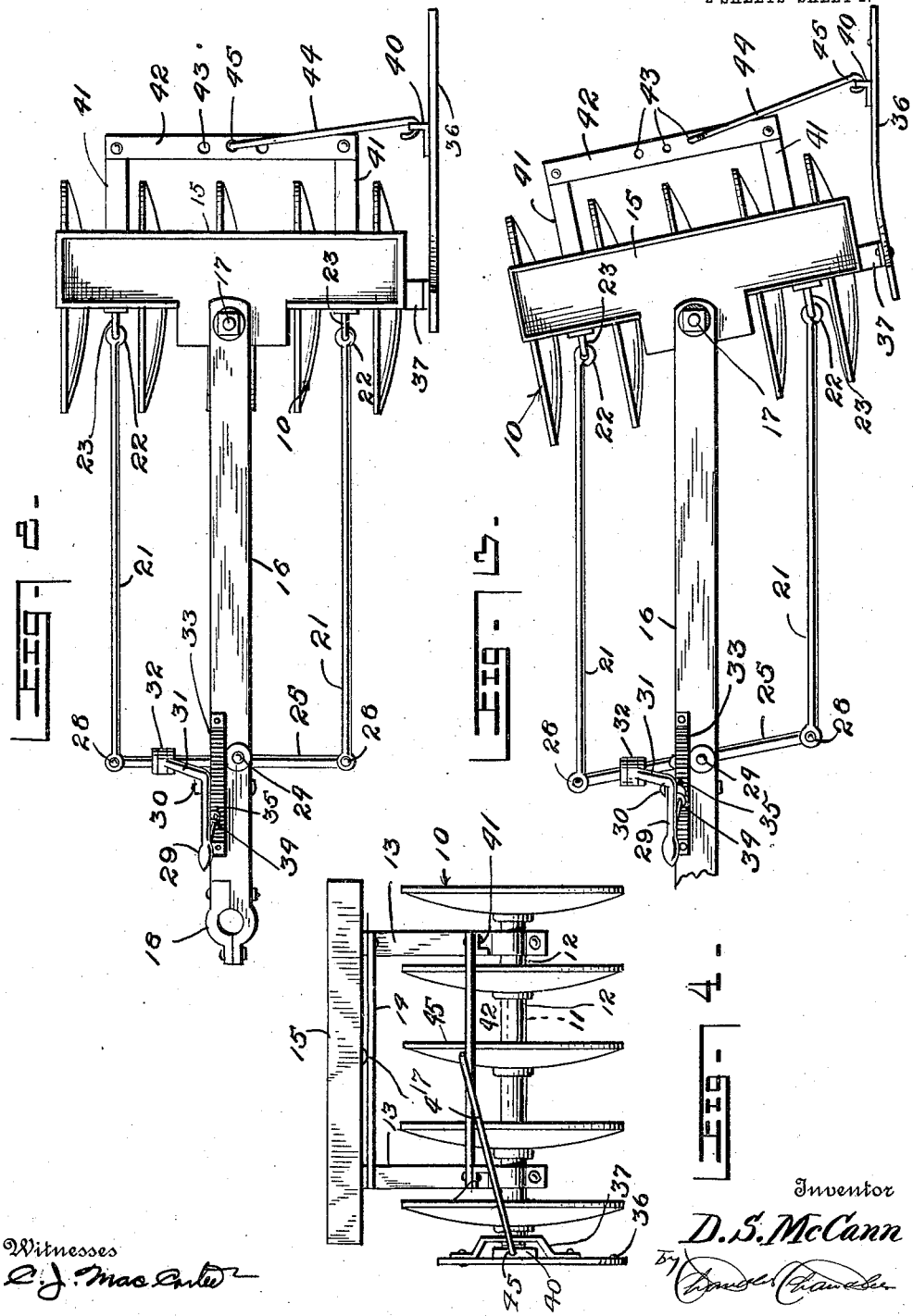

though various modifications may
UNITED STATES PATENT OFFICE.

DAVID S. McCANN, OF AMBROSE, NORTH DAKOTA.

SUBSOIL-DISK.

1,062,246. Specification of Letters Patent. Patented May 20, 1913.

Application filed August 30, 1912. Serial No. 717,916.

*To all whom it may concern:*

Be it known that I, DAVID S. McCANN, a citizen of the United States, residing at Ambrose, in the county of Divide, State of North Dakota, have invented certain new and useful Improvements in Subsoil-Disks; and I do hereby declare the following to be a full, clear, and exact description of the invention, such as will enable others skilled in the art to which it appertains to make and use the same.

This invention relates to subsoil disks, and has for an object to provide a subsoil disk adapted to be attached to a sulky plow and follow behind the same in the furrow to till the furrow from three to five inches deeper in order that a loose subsoil will exist at the bottom of the furrow rather than packed earth.

A further object of the invention is to provide a novel subsoil disk having means for shifting the disks to any desired angular position relatively to the draft beam whereby to penetrate deep or shallow.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of the device attached to a sulky plow. Fig. 2 is a plan view of the device. Fig. 3 is a plan view of the device with the disks shown in an adjusted position. Fig. 4 is a rear elevation of the device. Fig. 5 is a cross sectional view taken on the line 5—5 Fig. 1. Fig. 6 is a cross sectional view taken on the line 6—6 Fig. 1.

Referring now to the drawings in which like characters of reference designate similar parts, the device is shown to comprise a single gang of dished disks 10 mounted on a shaft 11 which is equipped with spacing tubes 12 between the disks. Standards 13 are provided at the lower ends with suitable journal boxes to receive the opposite ends of the shaft and have their upper ends connected by cross bars 14 upon which is fixed a box 15 within which may be placed stones or the like for weighting the device. A draft beam 16 is pivotally attached to the cross bar at the rear end through the instrumentality of an upstanding pivot bolt 17 carried at the center of the cross bar. The forward end of the cross bar is provided with a suitable clamp 18 in the present instance shown as a split ring for engagement with the bearing box 19 of the sulky plow guide wheel 20. It is to be understood that the draft beam may be attached to any suitable portion of the sulky plow.

For shifting the gang of disks to any desired angular position relatively to the draft beam a pair of rods 21 are arranged on opposite sides of the draft beam and are provided at their rear ends with eyes 22 which engage in eyes 23 carried by the standards. Depending from the forward end of the draft beam is a pivot pin 24 upon the lower end portion of which is pivotally secured a rock link 25, the rock link being held against escape through the instrumentality of an inclined brace 26 which is secured at the upper end to the bottom face of the draft beam and is further secured to the pivot pin below the rock link through the instrumentality of a nut 27. The forward ends of the rods 21 are pivotally secured to the ends of the rock link through the instrumentality of pivot bolts 28.

An operating lever 29 is pivotally secured intermediate the ends to the draft beam through the instrumentality of a pivot pin 30, the lower end of the lever being offset as shown at 31 and being provided with an eye 32 which encircles the rock link. A notched segment 33 is secured to the draft beam and a spring pressed latch 34 is mounted on the operating lever and equipped with a pawl 35 which engages the notched segment and locks the lever in any adjusted position. The operating lever may be shifted forwardly or rearwardly upon its pivot to actuate the rock link, the rods 21 being moved in opposite directions upon actuation of this link and serving to shift the gang of disks to any desired angular position relatively to the draft beam in order to cause the disks to penetrate deep or shallow.

For guiding the harrow a land-side 36 in the nature of a plate is pivotally secured to the shaft through the instrumentality of a yoke 37 the bight of which is provided with an opening to loosely receive the shaft, this yoke being arranged in upstanding position and being terminally secured to the land-side through the instrumentality of bolts 38 or similar connectors. The rear end of the land-side is equipped with an angle iron 40. Spaced arms 41 are fixed at their forward ends to the standards and are connected at their rear ends by a cross bar 42 which is centrally provided with a series of openings 43. A rod 44 is terminally provided with hooks 45 at its opposite ends, the lower end hook being engaged in an orifice formed in the angle iron 40, and the upper end hook being selectively engaged in any one of the openings 43.

What is claimed is:—

A subsoil disk including a draft beam, a gang of disks carried at the rear end of said draft beam, oppositely movable rods carried by said disks, a manually operatable shift link connected to said rods for actuating the same and moving said disks to angular positions relatively to said draft beam, a yoke carried in upright position by said disks, a guide plate secured to the terminals of said yoke and extending rearwardly beyond said disks, a horizontally extending frame carried by said disks, and a rod pivotally connected to the rear end of said plate and adjustably connected to the intermediate portion of said frame.

In testimony whereof, I affix my signature, in presence of two witnesses.

DAVID S. McCANN.

Witnesses:
P. G. ANDERSON,
C. P. GRYTRUSS.

---

Copies of this patent may be obtained for five cents each, by addressing the "Commissioner of Patents. Washington, D. C."